United States Patent [19]
Gunner et al.

[11] Patent Number: 5,491,692
[45] Date of Patent: Feb. 13, 1996

[54] HYBRID UNITS FOR A COMMUNICATION NETWORK

[75] Inventors: Christopher W. Gunner, Harvard, Mass.; John A. Harper, Golfe Juan, France; Ian M. C. Shand, Surrey, United Kingdom

[73] Assignee: Digital Equipment International Limited, Fribourg, Switzerland

[21] Appl. No.: 173,719

[22] Filed: Dec. 23, 1993

Related U.S. Application Data

[63] Continuation of Ser. No. 896,268, Jun. 10, 1992, abandoned.

[30] Foreign Application Priority Data

Jun. 14, 1991 [GB] United Kingdom ............ 9112898

[51] Int. Cl.$^6$ .................................................. H04L 12/46
[52] U.S. Cl. ........................................ 370/85.13; 370/94.3
[58] Field of Search ..................... 370/60, 94.1, 85.13, 370/85.14, 8.15, 94.3, 94.2; 340/825.5

[56] References Cited

U.S. PATENT DOCUMENTS

| | | | |
|---|---|---|---|
| 4,864,559 | 9/1989 | Perlman | 370/60 |
| 4,901,312 | 2/1990 | Hui et al. | 370/85.12 |
| 4,905,233 | 2/1990 | Cain et al. | 370/94.1 |
| 4,972,409 | 11/1990 | Backes | 370/13 |
| 4,984,235 | 1/1991 | Hillis et al. | 370/60 |
| 5,060,228 | 10/1991 | Tsutsui et al. | 370/13 |
| 5,079,765 | 1/1992 | Nakamura | 370/85.13 |
| 5,159,592 | 10/1992 | Perkins | 370/85.7 |
| 5,179,555 | 1/1993 | Videlock et al. | 370/85.13 |
| 5,265,092 | 9/1993 | Soloway et al. | 370/60 |
| 5,309,437 | 5/1994 | Perlman et al. | 370/94.1 |

OTHER PUBLICATIONS

European Search Report dated Oct. 19, 1992, Application No. 92305212.0.

Computer Communications Review, vol. 17, No. 5, Aug. 1987, New York, U.S.A., pp. 185 through 190. Title: "An Architecture for Network–Layer Routing in OSI". Author: Paul F. Tsuchiya.

IEEE Military Communications Conference, Oct. 1986, Monterey, California, U.S.A., pp. 15.3.1 through 15.3.13. Title: "Reducing Routing Overhead in a Growing DDN". Authors: J. Seeger, et al.

IEEE Journal on Selected Areas in Communication, vol. 7, No. 7, Sep. 1989, New York, New York, U.S.A., pp. 1131 through 1142. Title: "Networking of Networks: Interworking According to OSI". Authors: Fred M. Burg, et al.

*Primary Examiner*—Douglas W. Olms
*Assistant Examiner*—Chau T. Nguyen
*Attorney, Agent, or Firm*—A. Sidney Johnston; David A. Dagg

[57] ABSTRACT

A communication network consists of end units (EUs) and distribution units (DUs) coupled together by links which may include local area networks (LANs). The units maintain neighbor tables by sending out Hello messages which indicate the unit type and contain the network service access point (NSAP) IDs or addresses of the units. Data messages (packets) mainly originate and end at EUs. An EU maintains only partial routing information about neighbors, while the DUs collectively maintain complete information about all NSAPs. So if an EU wants to send a packet to an EU which is not a neighbour (and sometimes even if it is), it need merely send it to a neighboring DU; that DU, along with the other DUs, must find a route to the destination EU. This invention provides a hybrid unit (HU), which acts as a DU to EUs but as an EU to DUs. The HU provides DU-like message forwarding but only on a local basis within a subnetwork of EUs and HUs.

23 Claims, 9 Drawing Sheets

HYBRID UNITS FOR A COMMUNICATION NETWORK

This is a continuation of application Ser. No. 07/896,268 filed on Jun. 10, 1992 now abandoned.

The present invention relates to digital communication systems consisting of a plurality of nodes interconnected by a communication network.

GENERAL BACKGROUND

A communication system of the type with which the present invention is concerned consists of a plurality of units termed end units (EUs) and distribution units (DUs) connected together to form a switching network. Digital data messages are sent between the units by means of the network. (For convenience, we will here use the term "packet" or "data message" for messages conveying data between users, and the term "message" or "control message" for control messages concerned only with the internal management of the system.) In particular, we are concerned with communication using a network service that is connectionless; that is, in which each packet sent between any pair of units is treated independently of any other such packet by the network.

One distinction between an end unit and a distribution unit is that an end unit only forwards packets onwards into the network that it itself has originated. A distribution unit forwards both packets that is originates and packets that it receives from other units. Typically an end unit has only one link connecting it to the network, while a distribution unit has many links. The end units and the distribution units correspond respectively to the end systems and intermediate systems of an ISO standard (9542), but it will be realize that the present principles are not limited to systems conforming to that standard.

The operations of a communication system can generally be separated into a number of layers—the standard layer model is the 7-layer model of an ISO standard (7498). The present principles are not confined to that model, but it is convenient to use its terminology. We are primarily concerned here with layer 3, the network layer, which is concerned with the transfer of packets between units. Every unit has an identification at layer 3 which is unique in the whole system; for convenience, we can use the ISO standard term NSAP (network service access point) for this identification.

BACKGROUND—END UNITS AND DISTRIBUTION UNITS

Every end unit must of course have an NSAP. Often an end unit will have only one NSAP, but for a variety of reasons, an end unit can have a plurality of NSAPs. Distribution units will normally also have NSAPs, so that they can treated as end units for purposes such as system control and maintenance (system management).

When an end unit wants to send a packet to another end unit, it constructs the packet with a header or control section including its own NSAP and the NSAP of the end unit it is sending the package to—that is, the source and destination NSAPs. In general the transport of a packet through the communication network between two end units involves a number of distribution units.

Each unit (end units as well as distribution units) maintains some routing information, conventionally in the form of routing tables, which enable that unit to decide which of its neighbouring units it should forward the packet to as the next hop in its path to the ultimate destination. The routing tables associate each possible destination NSAP with some forwarding information. The latter includes the identification of the link over which a packet containing a particular destination NSAP should be forwarded.

If the link has multi-access capability (such as a Local Area Network (LAN) link which permits many units to connect to the same link), then the forwarding information also included the LAN identifier of the particular neighbouring unit on that link to which the packet should be forwarded. (This LAN identifier is a layer 2 address, and is independent of the layer 3 addresses, NSAPs, with which we are primarily concerned.)

In general, the routing tables of the distribution units must maintain complete routing information about all units in the network. This is essential for the core network to be able to pass (data) packets to all end units; if the core network does not have a record of the existence of an NSAP, it obviously cannot locate it (address it) and so cannot pass packets to it. The routing tables of the end units need not, however, maintain complete lists of all the distribution units to which they are connected. It is desirable for them to hold a reasonable number of distribution unit addresses, but a single distribution unit address would be sufficient to allow the end unit access to the core network.

When an end unit wants to send a packet, it looks in its routing tables for an entry with the destination NSAP. If it finds such an entry, it forwards the packet using the forwarding information associated with that entry in the tables. If it does not find a match, it chooses one of the distribution units present in its tables and forwards the packet to that distribution unit. At the same time it makes an entry in its routing tables for that NSAP with forwarding information set to that of the chosen distribution unit.

If the receiving distribution unit finds from its routing tables that the unit to which it should forward the packet is on the same link as the packet was received on. then it may send a special redirect control message to the source end unit, informing it that it can forward direct to the next hop unit for packets sent to that NSAP. The end unit receiving the redirect control message then updates its routing tables entry for that NSAP with the forwarding information provided by the distribution unit.

A distribution unit contains a considerable amount of routing information in its routing tables. In principle, an end unit need only contain the identifier of a single distribution unit in its routing tables. However, it is convenient for it to contain some routing information. This information will control the selection among the distribution units in dependence on the destination NSAPs or, if the destination unit is a neighbour of the end unit, it will contain the forwarding information necessary to send directly to the destination unit without passing through a distribution unit. Thus the routes to destinations can be optimized.

BACKGROUND—ROUTING TABLE MAINTENANCE AND HELLO MESSAGES

There is a variety of ways in which the routing tables can be generated and maintained. The routing functions of end units are concerned only with the initial hop of the path of a packet—from that end unit, to either the destination end unit or some distribution unit. The routing functions of distribution units can be divided into two classes: those concerned with the final hop in the path of a packet (from that distribution unit to the destination end unit), and those concerned with intermediate hops (DU-DU hops, to further distribution units).

To deal first with DU-DU hops, there are many ways in which routing information for these hops may be maintained in distribution units. These units typically exchange control messages, forming a routing protocol, which contain routing information, and each participates in a distributed routing algorithm which ensures that each distribution unit will construct routing tables that are compatible with those in each other distribution unit. The compatibility ensures that, for example, packets will eventually be delivered to their destination and will not repetitively circulate around a closed loop of distribution units.

End units typically do not participate in the routing algorithm used by the distribution units, relying instead on their neighbouring distribution units to forward packets appropriately. Thus end units typically have much smaller and simpler routing tables than distribution units.

We are primarily concerned here with routing involving end units—EU-EU, EU-DU, and DU-EU hops. For this, the routing functions require knowledge of the existence of neighbouring units. Such information may be configured into each unit by an operator or it may be learned dynamically through exchange of messages. The present system is concerned with networks in which this information is learned dynamically through the exchange of control messages called Hello messages. Such messages are sent to neighbouring units but are never forwarded onwards through the network.

An end unit sends out EU-Hello messages to announce its presence to neighbouring distribution units; and similarly, a distribution unit sends out DU-Hello messages to announce its presence to neighbouring end units. Optionally, units of a particular type can also note the presence of neighbouring units of the same type (e.g. end units can note the existence of other end units by listening to EU-Hello messages).

The Hello messages are sent out at regular intervals, to confirm the continuing presence of the sending units. Each receiving unit contains timers for the various sending units which it is receiving Hello messages from, to check that it continues to receive the appropriate Hello messages; if a timer times out, then the receiving unit deletes the corresponding sending unit from its records. Each unit is in general, of course, both a sending unit and a receiving unit for Hello messages.

The timer rate is normally set to be lower than the rate at which the associated type of sending unit sends Hello messages, so that an occasional lost Hello message does not result in the receiving unit deleting a sending unit from its records. If a distribution unit should disappear, that fact needs to become known to other units quickly, to avoid packets being forwarded by many units to a neighbouring distribution unit that has stopped working; if an end unit should cease working, only packets destined for that end unit will be lost. Distribution units therefore normally send out Hello messages much more frequently than end units.

Each EU-Hello message includes the NSAPs of the end unit producing it. Any unit which receives an EU-Hello message records the NSAPs in its routing tables. It also records, against each such entry in the tables, the forwarding information necessary to send a packet to that end unit. Normally, the forwarding information includes at least the identification of the link over which the EU-Hello message was received. If that link is a multi-access link, then the layer 2 addressing information necessary to send a packet over that link to that end unit and derived from the received packet may also be included in the forwarding information, although it is possible that this information could be derived subsequently by some other means.

Each DU-Hello message will normally include the NSAPs of the distribution unit producing it (though in some variants of this scheme, such information is not necessary and so is not included). Each end unit which receives these messages records them in its routing tables, together with the same forwarding information described above.

In summary, then, the present type of communication system essentially involves two types of unit, the end units and the distribution units. The end units contain routing tables which contain a relatively small and possibly incomplete amount of layer 3 information regarding immediately adjacent units; the distribution units contain routing tables which collectively contain complete information about all the units in the system and routes between them.

THE PRESENT INVENTION

The crux of the present invention is the provision of a further type of unit which can be connected between end units and a distribution unit and which appears as a distribution unit to the end units and as an end unit to the distribution unit. We will call this new type of unit a hybrid unit (HU). A hybrid unit has only one link to a distribution unit, but can have a plurality of links to which end units are connected (directly or via further hybrid units).

The links of a hybrid unit to which end units may be connected appear as links to a distribution unit to those end units; the link by which the hybrid unit is connected to a distribution unit appears as the link to an end unit to that distribution unit. This combination of features means that the hybrid unit can be used in a communication system of the present type without requiring any modification of the existing units of the system.

As our name and the above brief summary imply, a hybrid unit combines certain properties of end units and of distribution units. The hybrid unit provides some of the functions of a distribution unit, but a major distinction between the hybrid unit and a distribution unit is that the hybrid unit contains only a limited amount of routing information compared to a distribution unit.

The routing information of the hybrid unit is derived only from information obtained from its neighbours, and is similar in scope to that maintained by an end unit. In contrast, the routing information of a distribution unit contains all possible destinations in the network. The routing information processing which the hybrid unit has to perform is therefore much simpler than that which a distribution unit has to perform. The complexity of a hybrid unit is therefore closer to that of an end unit than that of a distribution unit.

The hybrid unit as so far described may be of fixed configuration. It can however be made reconfigurable, either manually or automatically. Such a reconfigurable hybrid unit further enhances the flexibility of communication systems in which it is used, particularly when the system changes (as the result of either deliberate changes to its topology or failures of parts of the system).

Since distribution units are complex, it is desirable to minimize their number. If there is a modest number of end units in an area which is reasonably compact geographically, this can be achieved by coupling the end units directly to a single distribution unit. If the number of end units in such an area is large, this technique becomes inconvenient, as the number of ports available on a distribution unit is generally fairly small. However, a large number of end units can be connected to a single distribution unit through a multi-access link such as a LAN, as described above.

If the end units are widely distributed geographically, however, then it is generally not feasible to connect them to a single distribution unit either directly or by a LAN. With a conventional system, they must be grouped into geographically small groups, each of which has a separate distribution unit.

The hybrid unit effectively provides an alternative way of connecting end units in such a situation. Each geographically small group of end units is connected to a hybrid unit, and the hybrid units are in turn connected to a single distribution unit.

Two types of hybrid unit, a simple (non-autoreconfigurable) unit and an autoreconfigurable unit, embodying the invention will now be described, by way of example, with reference to the drawings, in which:

GENERAL SYSTEM

Figure 1:
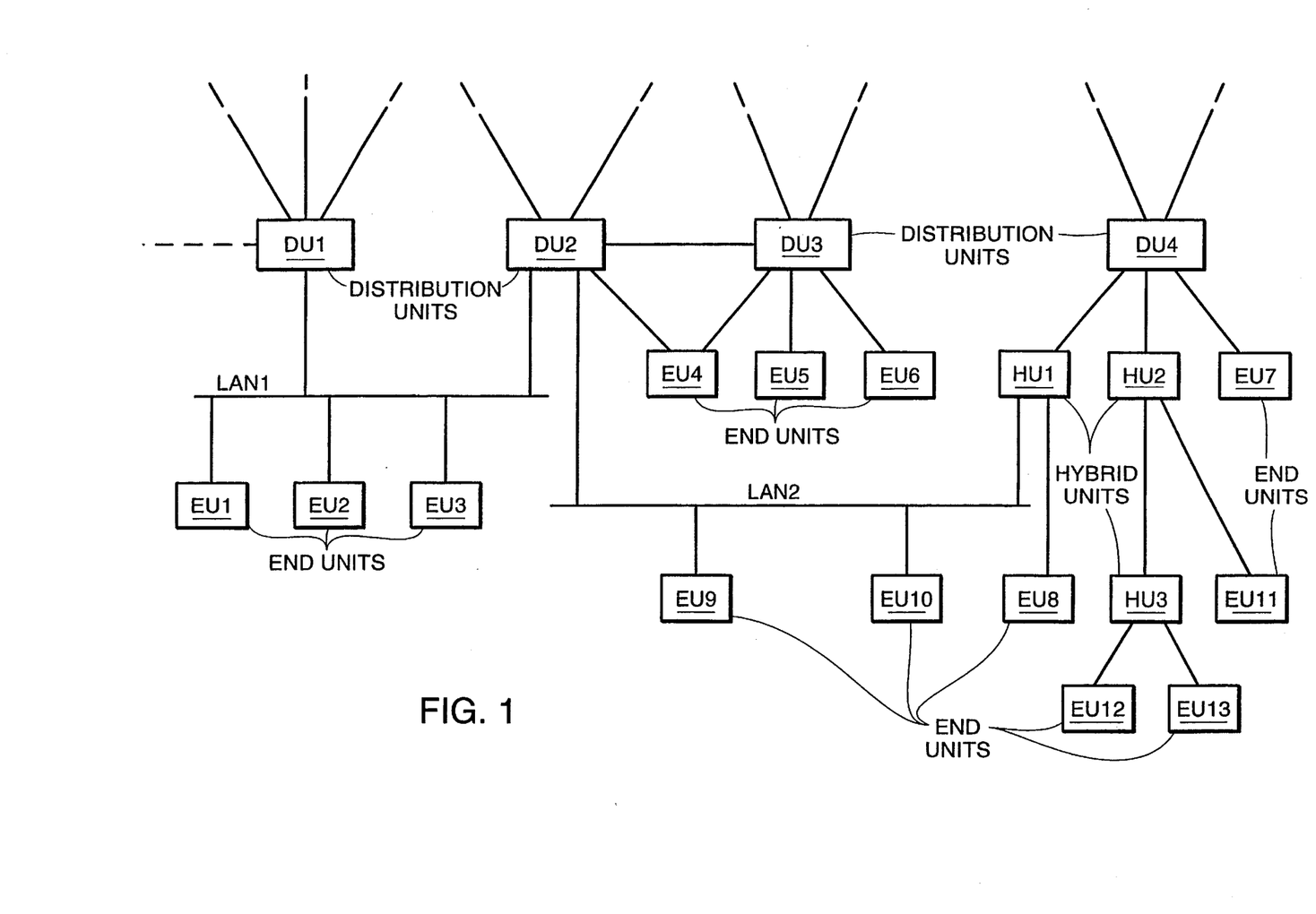
FIG. 1 is a block diagram of a communication system including hybrid units.

FIG. 1 shows a communication system including four distribution units DU1 to DU4. Distribution unit DU1 is connected to the LAN link LAN1, which also has three end units EU1 to EU3 connected to it. Distribution unit DU2 is connected to a further end unit EU4 and also, through separate links, to the LAN link LAN1 and a further LAN link LAN2. Distribution unit DU3 is connected to three further end units EU4 to EU7; the end unit EU4 is also connected to distribution unit DU2 (as just noted).

Figure 2:
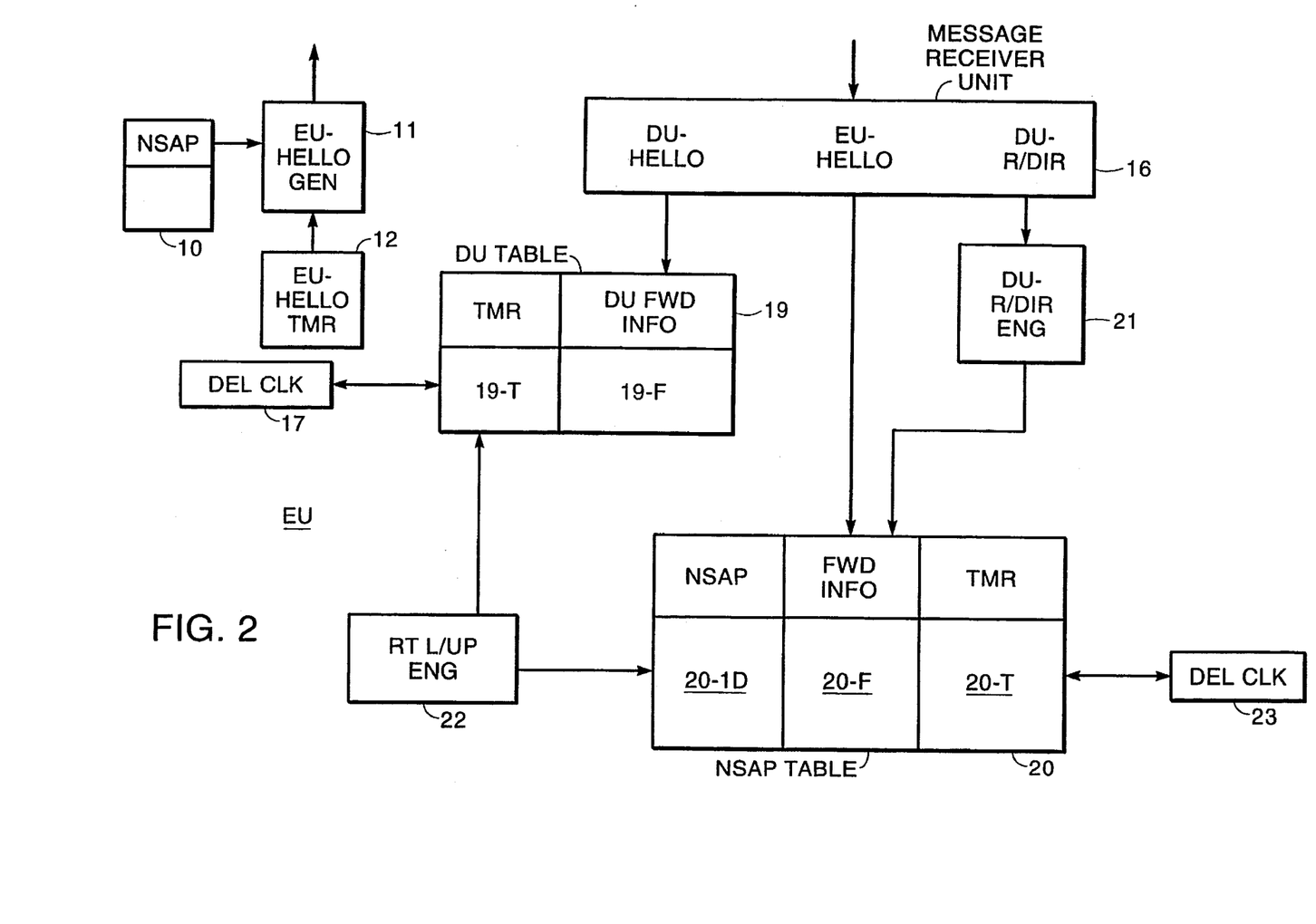
FIG. 2 is a block diagram of an end unit, with particular reference to its routing tables.

The system as described so far is conventional, and shows a variety of features of conventional systems (although many systems do not include all these various features). End unit FIG. 2 is a block diagram of the routing tables and associated components of an end unit (say EU1). The main components are a local NSAP list store 10; a control message receiver unit 16, whose purpose is receiving control messages; two routing tables, a distribution unit table 19 and an NSAP table 20; and a route look-up engine 22.

The local NSAP list store 10 contains the NSAP(s) of the unit, and is coupled to an EU-Hello message generator 11, which is also fed from an EU-Hello timer 12. At suitable intervals determined by the timer 12, the message generator 11 assembles EU-Hello messages, containing the NSAP(s) of the end unit, and transmits them on the links from the end unit (e.g. a LAN, or links such as that from end unit EU5 to distribution unit DU3 or those from end unit EU4 to distribution units DU2 and DU3).

Each location in the distribution unit table 19 consists of two sections, a timer section 19-T and a distribution unit forwarding information section 19-F. Any incoming DU-Hello message from a distribution unit neighbouring the end unit is received and processed by the receiver unit 16. This unit writes, in section 19-F of table 19, information about the existence of the distribution unit, together with the forwarding information necessary to send a packet to the distribution unit. As a result, the table 19 will gradually accumulate the identifiers of the distribution units coupled to the end unit. The number of entries in the table may be restricted so that only the most recently heard from distribution units are contained in the table, for example.

The unit 16 also writes into the timer section 19-T of each location in the distribution unit table 19 the time (from a deletion clock unit 17) when the last Hello message for that location was received. The deletion clock unit 17 constantly compares the stored times in the timer section 19-T with the current time, and erases the entry from the distribution unit table if the time difference exceeds a preset value. (This value may be derived from a field in the DU-Hello, so that it can be different for different distribution units in the table.) Thus the contents of the distribution unit table are maintained to match the active distribution units currently neighbouring the end unit.

Each location in the NSAP table 20 consists of three sections, a timer section 20-T, an NSAP section 20-ID, and a forwarding information section 20-F. For each NSAP contained in the table, section 20-F contains forwarding information for use when sending packets destined to that NSAP. A deletion clock unit 23 operates, in conjunction with the timer section 20-T of each location in the NSAP table and the writing into those sections of the last update times, to delete obsolete entries from the table.

When the end unit wants to send a data packet, it first uses the route look-up engine 22 to look for an entry in the NSAP table 20 whose NSAP (in section 20-ID) matches the destination NSAP for the packet. If such an entry exists in the NSAP table, the end unit uses the associated forwarding information in section 20-F to send the packet to the next hop neighbouring unit.

If there is no entry in the NSAP table for the destination NSAP, the route look-up engine selects an entry, e.g. at random, in the distribution unit table 19. It adds a new entry to the NSAP table 20 with the NSAP section 20-ID set to the destination NSAP of the packet, the forwarding section 20-F set to the forwarding information extracted from the selected information in the distribution unit table 19, and the timer section 20-T set to a suitable value.

If a distribution unit responds by sending a distribution unit redirect message to the originating end unit, this is passed by the control message receiver unit 16 to a distribution unit redirect engine 21, which changes the forwarding information in section 20-F of the NSAP table 20 to that specified in the distribution unit redirect message and resets the associated timer in section 20-T (to a preset value). When the end unit starts up, the routing table 20 is initially empty. As packets are sent out to different destinations, so entries gradually accumulate in this table.

Each time an entry is made in the NSAP table 20, the timer section 20-T for that entry is updated. Entries in this table eventually time out and are deleted by the deletion clock 23. They are then reformed as described above when new packets are sent by the end unit.

The size of the NSAP table 20 is usually limited. If either the route look-up engine or the distribution unit redirect engine needs to make a new entry in this table and it is full, then an entry is deleted. The entry for deletion may be chosen at random or based on the value of its associated timer section 20-T.

As noted above, it is possible for end units to listen to EU-Hellos. This provides another source of information for maintaining the NSAP table 20. This will, however, involve fairly substantial processing overheads, and is liable to fill up the table with NSAPs which the end unit is unlikely to want to send packets to, so in practice this is not usually done.

Distribution unit

Figure 3:
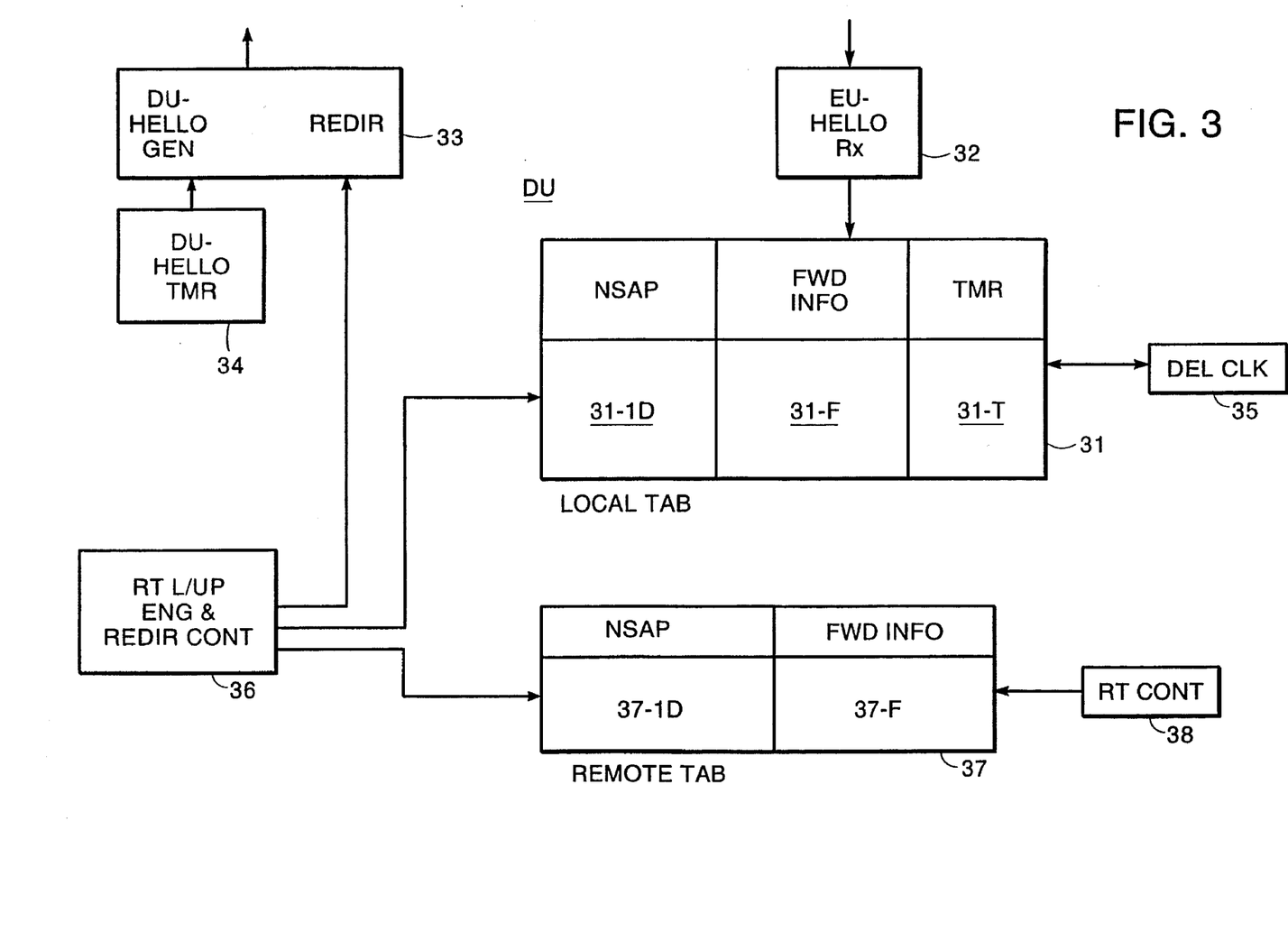
FIG. 3 is a block diagram of a distribution unit, with particular reference to its routing tables.

FIG. 3 is a block diagram of the routing tables and associated components of a distribution unit (say DU1). The distribution unit has a local NSAP table 31, a remote NSAP table 37, a control message receiver 32 (which is mainly for EU-Hello messages), and a control message generator 33 (which is for DU-Hello messages and redirect messages).

The DU-Hello messages are generated in unit 33. These are transmitted on all links of the distribution unit at suitable intervals, as determined by a timer 34.

The local NSAP table 31 contains an NSAP section 31-ID, a timer section 31-T, and a forwarding information section 31-F. This table contains the NSAPs of end units which are neighbours of the distribution unit. EU-Hello messages are received by unit 32, and the NSAP(s) and associated forwarding information are written into the appropriate sections of the table 31, along with the time of receipt. Thus the table 31 will gradually accumulate the identifiers of the end units coupled to the distribution unit. A deletion clock unit 35 maintains these entries current, in the same way as the deletion clock unit 17 of the end unit shown in FIG. 2.

The distribution unit also contains a remote NSAP table 37 which, like table 31, contains entries associating NSAPs (in section 37-ID) with forwarding information (in section 37-F). Entries in this table are made and deleted by a routing control engine 38 which implements the distributed routing algorithm used by all the distribution units. This table contains the NSAPs of end units which are not neighbours of the distribution unit. (In practice, the organization of this table may exploit the generally hierarchical nature of NSAPs.)

When the distribution unit receives a packet, it matches the destination NSAP of the packet against the entries in sections 31-ID and 37-ID of the routing tables, using the route look-up engine 36. The forwarding information is obtained from the appropriate routing table, and the packet is forwarded towards the destination. If the destination NSAP is in the local table 31, the destination end unit is a neighbour of the distribution unit. If it is in the remote table 37, then the end unit is not a neighbour of the distribution unit, so the forwarding information will contain details of the next distribution unit to which the packet is to be forwarded.

If the forwarding information used by the distribution unit results in the packet being forwarded to another unit connected to the same link as that on which the packet was received, the routing look-up engine 36 generates a redirect message containing the destination NSAP and the forwarding information matching that NSAP in the routing tables, and sends the message to the source end unit.

The operation of the system as described so far is conventional, and shows a variety of features of conventional systems (although many systems do not include all these various features).

Hybrid units—general

Returning to FIG. 1, the system also includes a distribution unit DU4, with a neighbouring end unit EU7 and also two neighbouring hybrid units HU1 and HU2. Hybrid unit HU1 has a neighbouring end unit EU8 and is also attached to a LAN link LAN2. Hybrid unit HU2 has a neighbouring end unit EU11 and a further neighbouring hybrid unit HU3. Hybrid unit HU3 has two neighbouring end units EU12 and EU13. These parts of FIG. 1 show a variety of ways in which hybrid units may be used (although many systems will not include all these various features).

The hybrid units are strictly hierarchical, with a single superior link and a plurality of subordinates allowed. On its superior link, a hybrid unit appears as an end unit; thus hybrid units HU1 and HU2 appear as end units to distribution unit DU4, sending EU-Hello messages up to it and receiving DU-Hello messages from it. To its subordinates, a hybrid unit appears as a distribution unit; thus hybrid units HU1 to HU3 appear as distribution units to end units EU8 to EU13, sending out DU-Hello messages to those end units and receiving EU-Hello messages from them.

In principle, HU1 could have more than one port appearing as an end unit (rather like end unit EU4). This would result in multiple paths from the end units subordinate the hybrid unit. In the case of a hybrid unit, this would produce no significant advantage and would result in various complications, so we prefer not to implement this possibility.

Hybrid units can be cascaded, as shown by hybrid units HU2 and HU3. The same hierarchic rules apply, so that hybrid unit HU2 appears as a distribution unit to hybrid unit HU3 and hybrid unit HU3 appears as an end unit to hybrid unit HU2, with EU-Hello messages passing upwards from HU3 to HU2 and DU-Hello messages passing from HU2 to HU3.

A hybrid unit performs both Hello message and data packet routing functions. Considering first its response to data packets, it forwards these in both directions. It performs a routing function on these, forwarding packets coming from the distribution unit above it on to the appropriate link to the destination unit, and forwarding packets coming from the end units below it either on up to the distribution unit above it or directly out downwards to the destination unit.

Considering its routing control functions, the hybrid unit collects the NSAPs of its subordinate end units received through EU-Hello messages (including those which are indirectly subordinate through further hybrid units), and appears as a single ordinary end unit (albeit with an unusually large number of NSAPs) to its superior unit (whether a further hybrid unit or a distribution unit) by passing on, in EU-Hello messages which it sends to its superior, all the NSAPs it has collected in this way.

Simple hybrid unit

Figure 4:
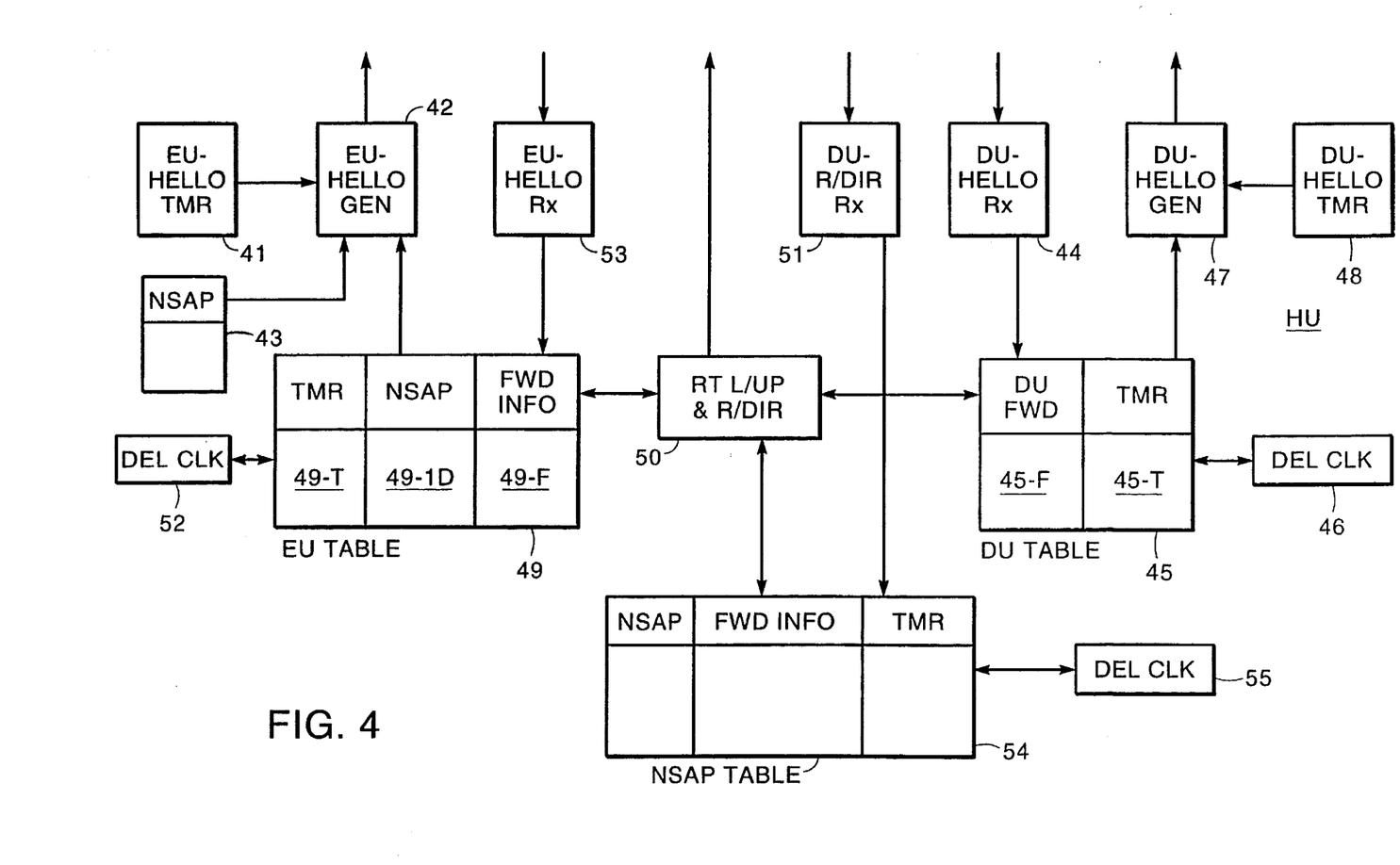
FIG. 4 is a block diagram of a simple hybrid unit, with particular reference to its routing tables.

FIG. 4 is a block diagram of the routing table and associated components of a simple (i.e. non-autoreconfigurable) hybrid unit (say HU1). This contains three routing tables: a distribution unit table 45 and an NSAP table 54, corresponding respectively to the distribution unit table 19 and NSAP table 20 of the end unit of FIG. 2, and an end unit table 49, corresponding to the local routing table 21 of the distribution unit of FIG. 3.

Considering first the upward flow of messages, an EU-Hello message receiver 53 receives EU-Hello messages from end units and possible hybrid units lower in the hierarchy, and feeds these messages into the end unit table 49. This table has three sections, section 49-ID for the NSAPs contained in the incoming messages, section 49-F for associated forwarding information, and section 49-T for the times of receipt. A deletion clock and timer unit 52 provides these times and deletes entries in the table which are not updated by fresh EU-Hello messages at suitable intervals. The table 49 must be large enough to retain all NSAPs of all the end units below the hybrid unit. (This is like the routing tables of the distribution units, and in contrast to the routing tables of the end units.)

An EU-Hello generator 42 is coupled to the table 49 and to a local NSAP list store 43 which stores the NSAP(s) of the hybrid unit itself. At intervals determined by a timer 41, this generates EU-Hello messages which include all the NSAPs in end unit table 49 and those in store 43 and transmits these to the distribution unit or superior hybrid unit.

Considering now the upward flow of data packets, if the hybrid unit receives a data packet coming up to it from an end unit or subordinate hybrid unit, the route look-up engine 50 inspects the header of the packet to determine whether there is a match between its destination NSAP and any NSAP in the end unit table 49. If there is, then the hybrid unit forwards the packet on the appropriate output link using the forwarding information associated with that NSAP in end unit table 49.

If there is no match in the end unit table 49, the route look-up engine 50 looks for a match between the destination NSAP of the packet and any NSAP in the NSAP table 54. If there is, then the hybrid unit forwards the packet on the appropriate output link using the forwarding information associated with that NSAP in the NSAP table 54. Table 54 is updated by redirect messages received by a redirect message receiver 51 from a distribution unit or superior hybrid unit and by a deletion clock unit 55.

If there is no match in either of these tables, then the hybrid unit forwards the packet up to a distribution unit or superior hybrid unit using the same algorithm as that used by the end unit. The route look-up engine 50 enters the destination NSAP into the NSAP table 54 together with the forwarding information associated with the distribution unit.

The route look-up engine 50 may also generate updating redirect control messages like those generated by the distribution units, as discussed above, sending these to the end units and subordinate hybrid units.

Considering now the downward flow of data packets, the hybrid unit inspects the header of a packet received from a distribution unit or superior hybrid unit, matches the NSAP against the NSAPs in the end unit table 49, and forwards the packet downwards according to the forwarding information associated with the NSAP in table 49.

Considering finally the downward flow of control messages, the hybrid unit receives DU-Hello messages sent by superior distribution units or hybrid units and these are processed by the DU-Hello message receiver 44 and stored in the distribution unit table 45 (in exactly the same way as an end unit processes these messages). On those links to subordinate units (hybrid units or end units), the hybrid unit periodically sends DU-Hello messages using the DU-Hello generator 47 controlled by the DU-Hello timer 48.

The hybrid unit also receives distribution unit redirect messages through the distribution unit redirect message receiver 51 and modifies the information in the NSAP table 54 based on the NSAP and forwarding information received in the distribution unit redirect message.

The hybrid unit thus appears as an ordinary distribution unit to the end units and any subordinate hybrid units, and as an ordinary end unit to the superior distribution units or superior hybrid units.

It will be noted that if there should be a failure of the superior unit or units of a hybrid unit (i.e. of the distribution or superior hybrid unit or units), the part of the network including and below the hybrid unit can continue to operate. The hybrid unit can continue to forward packets between the end units below it.

In general, each hybrid unit has several links. One of these links is that connected upwards in the hierarchy, to a distribution or a superior hybrid unit, and behaving as an end unit link, and we can term this an HUE link. The remaining links all behave as links of a distribution unit, and we can term them HUD links.

Autoreconfiguration

We have assumed so far that the HUE or HUD nature of the various links of the hybrid units is predetermined. In practice, it is convenient for the nature of the links not to be predetermined. This allows the hybrid unit to have its links connected arbitrarily. If this is the case, then the hybrid unit must be configured so that the appropriate link becomes its HUE link and the remaining links become HUD links.

The simplest form of configurable hybrid unit is one in which the configuration is operator determined. This may require direct manual setting of the links, or it may be performed by control messages generated by the operator but sent through the network to the hybrid unit.

In large and complicated systems, there may be more than one possible way to configure some of the hybrid units, or it may be desirable or necessary to change their configurations in the event of a network change (which may be a permanent addition to the network or deletion of some part of the network, or may be a temporary change resulting from a temporary failure or recovery from a failure, for example of a link).

If, in the FIG. 1 system, distribution unit DU4 were to fail, end unit EU8 would become inaccessible. It would therefore be desirable to reconfigure hybrid unit HU1 to present an HUE link to the LAN link LAN2, and hence to distribution unit DU2, so making end unit EU8 accessible again. Such reconfiguration can be achieved by operator control, just as with initial configuration.

It will be realized that the failure of distribution unit DU4 makes end units EU7 and EU11 to EU13 inaccessible to the rest of the system, and this cannot be rectified by any reconfiguration. End units EU11 to EU13 remain in communication with each other, however, via the hybrid units HU2 and HU3.

The FIG. 1 system could be configured with hybrid unit HU1 presenting an HUE link to distribution unit DU2 via LAN link LAN2, and being effectively disconnected from distribution unit DU4 even if that unit were fully functional. This could result, for example, if distribution unit DU4 recovered after its failure.

Direct manual reconfiguration is often far from convenient, because the part of the system where a failure occurs may be remote from an operator capable of performing the reconfiguration. Reconfiguration by remote operator control is also often not satisfactory. It may be difficult or even impossible for a remote operator to determine the precise nature of the system failure; and because the system has undergone a failure, it may be difficult or impossible achieve the optimum reconfiguration remotely.

The hybrid units therefore preferably include autoconfiguration means, whereby they configure the HUD or HUE nature of each of their links automatically.

If a hybrid unit has no hybrid unit as neighbour, autoconfiguration requires only that it should find a distribution unit to which it can present an HUE link. Thus hybrid unit HU1 can automatically reconfigure itself, in the event of a failure of distribution unit DU4 or its link to that unit, simply by making its link to LAN link LAN2 an HUE link, so becoming subordinate to distribution unit DU3.

If a hybrid unit has a hybrid unit neighbour, however, then it may be desirable to reverse the HUD-HUE direction of the link between the two hybrid units; and if both the hybrid units have distribution units as neighbours, then this may be necessary. Further, the possibility of a circulating path for data packets must be avoided. (This could happen if, for example, there are three hybrid units all connected together.) In general, therefore, au configuration algorithm is required which results in the system remaining connected as far as possible while avoiding inconsistency.

There are of course various possible general algorithms for autoconfiguring a network containing hybrid units. The major objects to be achieved in general can be defined in various ways, such as:

1. there should be no closed loop of hybrid units with HUD to HUE connections;
2. no hybrid unit should have more than one HUE link; and
3. as many hybrid units as possible should have HUE links.

If connection to the network (i.e. to a distribution unit) is possible, then condition 3 means that every hybrid unit has an HUE link, and condition 1 then means that all hierarchically upward paths through hybrid units must eventually terminate at a distribution unit. If connection to the switching network is not possible, then these conditions result in precisely one hybrid unit not having an HUE link, i.e. becoming the master hybrid unit, with all the other hybrid units forming hierarchically upward paths to that master hybrid unit.

We will describe a mechanism using a spanning tree algorithm which permits arbitrary topologies of distribution units, hybrid units, and end units. Simplifications of this mechanism are possible if the topology of the subnetwork of neighbouring hybrid units, plus the distribution units and end units neighbouring the subnetwork, is restricted such that there are no alternative paths between any two units, and there is only one link from a connected set of hybrid units to a distribution unit.

To permit autoconfiguration, a new control message is defined, termed a HU-Hello. This allows neighbouring hybrid units to recognize each other as hybrid units, and contains some information which allows hybrid units to use a spanning tree algorithm. Hybrid units use the algorithm by combining information from the HU-Hellos they receive with their own local information.

The spanning tree algorithm generates a singly-connected logical topology for the subnetwork from the arbitrary physical topology, and in addition forces each hybrid unit to agree with its hybrid unit neighbours the HUD/HUE states of its links so that the hybrid units of the subnetwork act together correctly. The algorithm selects a single hybrid unit as the root of a tree spanning the subnetwork, choosing for this purpose the hybrid unit with highest priority (as described below).

The priority scheme is designed so that the algorithm will operate in all hybrid unit subnetworks, whether or not they have distribution unit neighbours. If a hybrid unit has a distribution unit neighbour, its inherent priority is replaced by a boosted priority which is higher than the inherent priority of any hybrid unit. In the presence of distribution unit neighbours, therefore, the algorithm always selects as the root hybrid unit a (single) hybrid unit which has a distribution unit neighbour.

The spanning tree algorithm operates over the whole of the subnetwork of hybrid units; processing is carried out in the individual hybrid units, with communication between them for the purposes of the algorithm being by means of the HU-Hello messages. The operation of the algorithm is thus distributed among the various hybrid units of the subnetwork. The processing in each hybrid unit consists of a sequence (cycle) of operations which is repeated each time the state of any neighbour of the unit changes in a significant way. Once a cycle has been initiated in a unit, that cycle will automatically proceed to completion. The eventual result is that the hybrid unit with the highest priority is selected as the root, to which all other hybrid units become inferior, with a simply connected connection pattern. This may involve making certain links effectively inoperative for the transfer of data messages.

The operation of the algorithm is initiated whenever any change in the state of the system—e.g. a link or a distribution unit or a hybrid unit becoming operative or inoperative—occurs. This may be detected by a hybrid unit noticing some change—e.g. a link becoming operative or inoperative.

Figure 6:
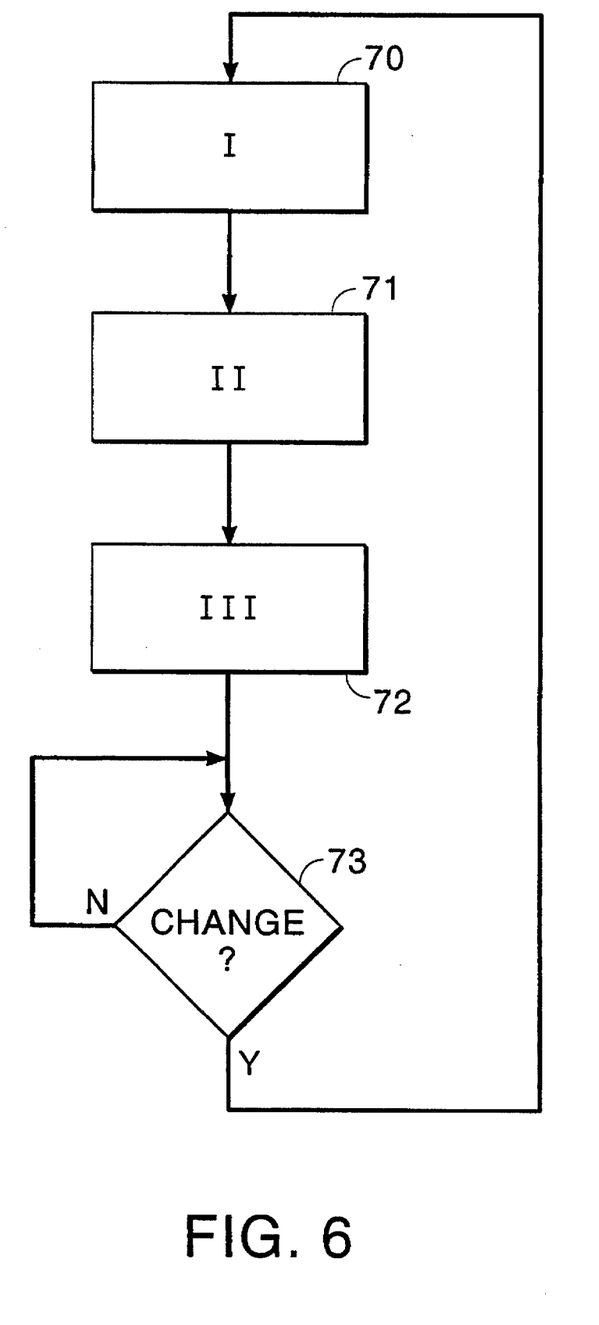
FIG. 6 is a general flow diagram of the operation of the hybrid unit of FIG. 5.

Each cycle of the algorithm in a unit consists of three successive stages, I to III, shown as blocks 70 to 72 in FIG. 6. In stage I, a priority, a root cost, and a designation are determined for each link. In stage II, the highest priority link is determined. In stage III, the state of each link is set to HUD or HUE from the information calculated in stages I and II. The three stages are performed in succession, and the unit then enters a waiting state, block 73, and remains in that state until a change occurs. The change may be any of the state variables used as input to the spanning tree algorithm such as the operational state of a link or the contents of a neighbour's HU-Hello message.

Hybrid units send HU-Hello messages on all their links. Neighbouring distribution units and end units ignore these messages—only neighbouring hybrid units receive and act upon their contents. The contents of an HU-Hello message are link-dependent, and include a priority field and a cost field. The priority is set to the highest priority from all link priorities (excluding the link over which the HU-Hello message is to be sent) and the priority of the hybrid unit itself. The cost field contains the accumulated cost of the path from a hybrid unit to the root hybrid unit; this is the sum of the costs of each of the links on the path from the hybrid unit to the root hybrid unit.

The spanning tree algorithm requires various choices to be made between different entities of the same kind (such as hybrid units, or links). For these choices, each of the entities has a value termed a priority, and the choice is made by selecting the entity with the highest priority. For convenience, these priorities are defined as unsigned integer numbers with lower integer values having higher priority. Also for convenience, separate priorities are combined together in various ways to perform priority comparisons.

In particular, the priority field of an HU-Hello message is a concatenation of three subfields which are, in descending order of significance: DUbit, a single bit which is 0 if the hybrid unit has a neighbouring distribution unit and 1 otherwise; a hybrid unit priority value which is configurable by the operator; and a unique identity value HU-ID. The highest priority is taken as the lowest value (treating the combined bit fields as unsigned numbers). We will use the notation <x,y,z> for a priority formed by concatenating the fields x, y, and z, with x being the most significant field.

The hybrid unit priority value can be used to manually configure a desired hybrid unit to become the root in the absence of any distribution units attached to the subnetwork; the HU-ID field must be unique for each hybrid unit in the subnetwork.

Autoreconfigurable hybrid unit

Figure 5:
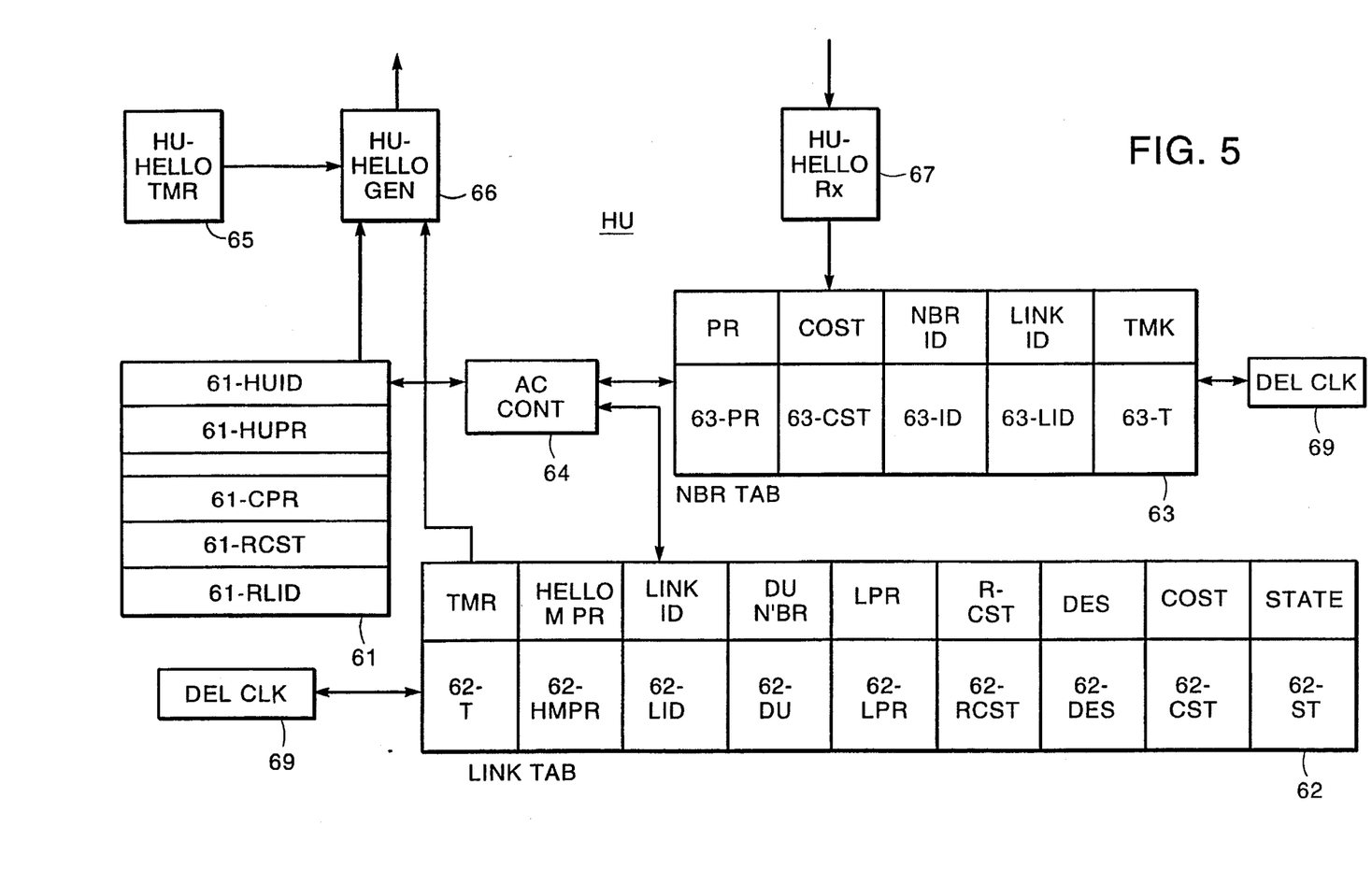
FIG. 5 is a block diagram of the components of an autoreconfigurable hybrid unit additional to those shown in FIG. 4.

FIG. 5 is a block diagram of the circuitry (additional to that shown in FIG. 4) of a hybrid unit with autoconfiguration. The main components are: a set of registers 61; a link table 62; a neighbour table 63; autoconfiguration control logic 64; and an HU-Hello generator 66 which is controlled by a timer 65 and periodically sends H-Hello messages on each of the links of the hybrid unit. Deletion clocks 68 and 69 operate in conjunction with timer sections 62-T and 63-T in tables 62 and 63 to remove entries from these tables if no messages are received to update them within suitable time limits. The operation of the spanning tree algorithm applied at each hybrid unit can be described along with this circuitry.

HU-Hello messages received by an HU-Hello receiver 67 are used to maintain information about the neighbouring hybrid units in the hybrid unit neighbour table 63. The information consists of: the identification of the link on which the neighbour exists (link ID), held in a section 63-LID; the priority value contained in the HU-Hello message, held in a section 63-PR; the cost value contained in the HU-Hello message (the reported cost of the path from the neighbour hybrid unit to the root hybrid unit), held in a section 63-CST; the identifier of the sending hybrid unit contained in the HU-Hello message, held in a section 63-ID. (On a multi-access link such as a LAN, there may of course be many neighbouring hybrid units).

The hybrid unit also maintains a link table 62. Each entry in this table records information about one of the links of the hybrid unit. The link ID, in section 62-LID, is the link identifier (unique to the link within the hybrid unit). The cost, held in section 62-CST, is a value set by the operator to determine a preference for choosing one link over another in the spanning tree algorithm. The distribution unit neighbour, held in section 62-DU, is a Boolean value (a single bit) set by the DU-Hello receive logic 44 of FIG. 4 to 1 (true) if the distribution unit neighbour table 45 of FIG. 4 contains an entry for a distribution unit on that link, and to 0 (false) otherwise.

Each link entry in the link table 62 includes a link priority section, 62-LPR. The manner in which the link priority determined is described below. Each link entry also contains a Hello-message priority, held in section 62-HMPR, which is the highest of the link priorities of all other links in the link table and the priority of the hybrid unit itself. The HU-Hello generator 66 periodically sends, on each of the links of the hybrid unit, HU-Hello messages, the contents of which are link-dependent; in particular, the priority field of an HU-Hello message is set to the priority value 62-HMPR from the appropriate entry in the link table 62, and the cost field is set to the value in the register 61-RCST.

The set of registers 61 includes a hybrid unit identifier register 61-HUID and a hybrid unit priority register 61-HUPR. Register 61-HUID stores the identifier HU-ID of the hybrid unit. This must be unique among all hybrid units in a subnetwork; it may be configured by the operator or be derived from some other unique property of the hybrid unit. Register 61-HUPR stores the hybrid unit priority of the hybrid unit. This is set by the operator to determine a preference for one hybrid unit in the subnetwork over others in choosing the spanning tree root.

The other three registers in the set of registers 61 are set by the control logic 64, which also sets values in the link table 62. The control logic 64 implements the spanning tree algorithm, which consists of three successive stages. The operation of the control logic 64 can be triggered in response to any change in any of the values used as inputs to the logic from any of the tables.

Before the first execution of stage I, the system is initialized by setting the register 61-RCST to 0 and, in the link table, section 62-HMPR to the value <1, 61-HUPR, 61-HUID> for each link.

Stage I

In stage I, the control logic 64 determines for each link, a priority, a root cost, and a designation, and sets these in the entry for that link in the link table 62 (in the priority section 62-LPR, the root cost section 62-RCST, and the designation section 62-DES respectively). The Designation field 62-DES for each link is used on multi-access links to select one hybrid unit only to act as a DU on that link in the case where more than one hybrid unit may compute the link to be away from the spanning tree root. The hybrid unit with highest priority on the link will set Designation to 1 (true) and act as a DU, while all other hybrid units on the link, for which the link is away from the spanning tree root, will set Designation to 0 (false) and send and receive only HU-Hellos on that link.

For each link in the table 62, the control logic finds the highest priority from the set of priorities derived from the priorities of all neighbours on the link (obtained from the Neighbour table 63), and including the priority sent in HU-Hellos on this link by the hybrid unit itself.

Figure 6A:
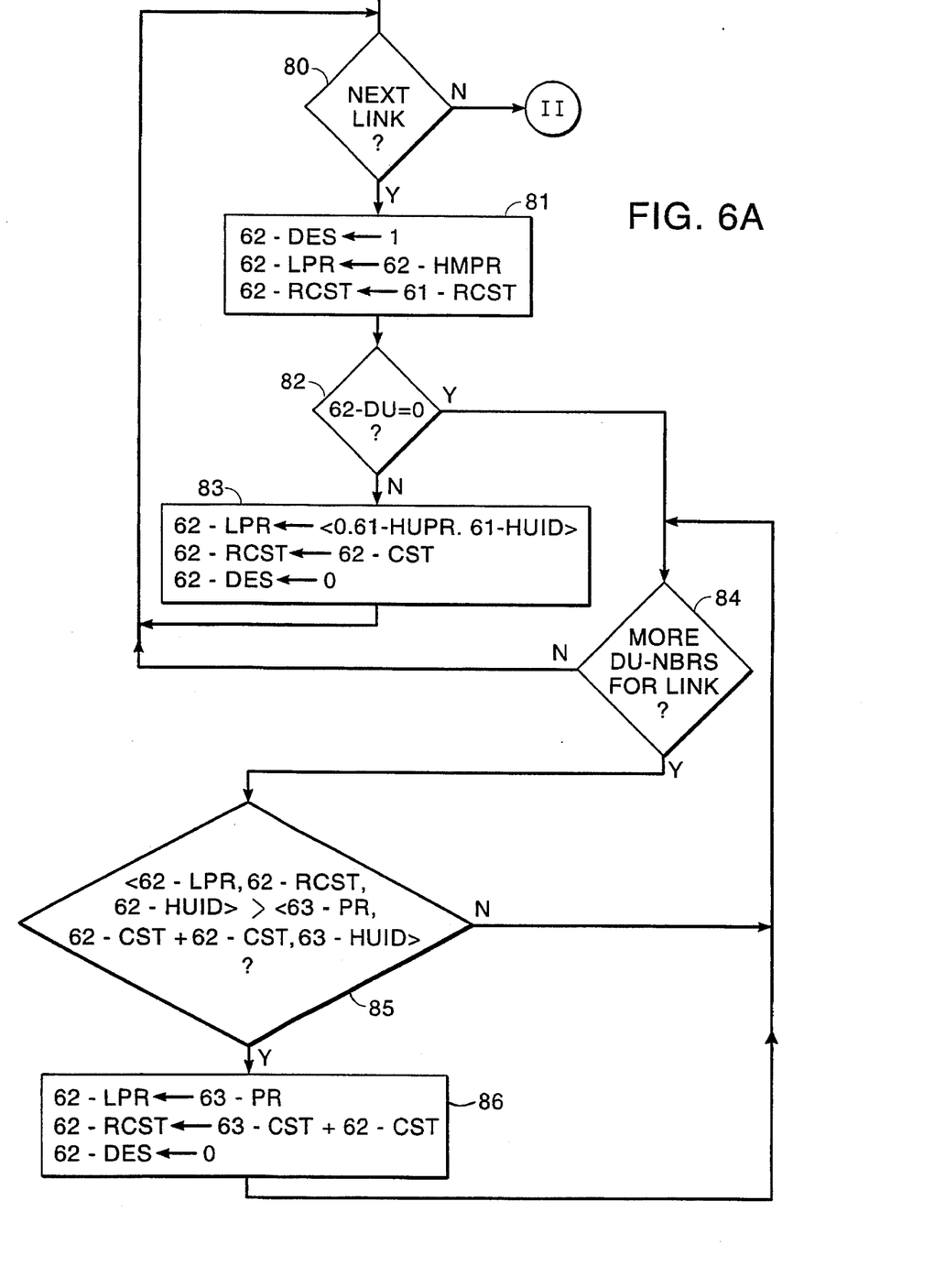
FIGS. 6A to 6C show the blocks of FIG. 6 in more detail.
Figure 6B:
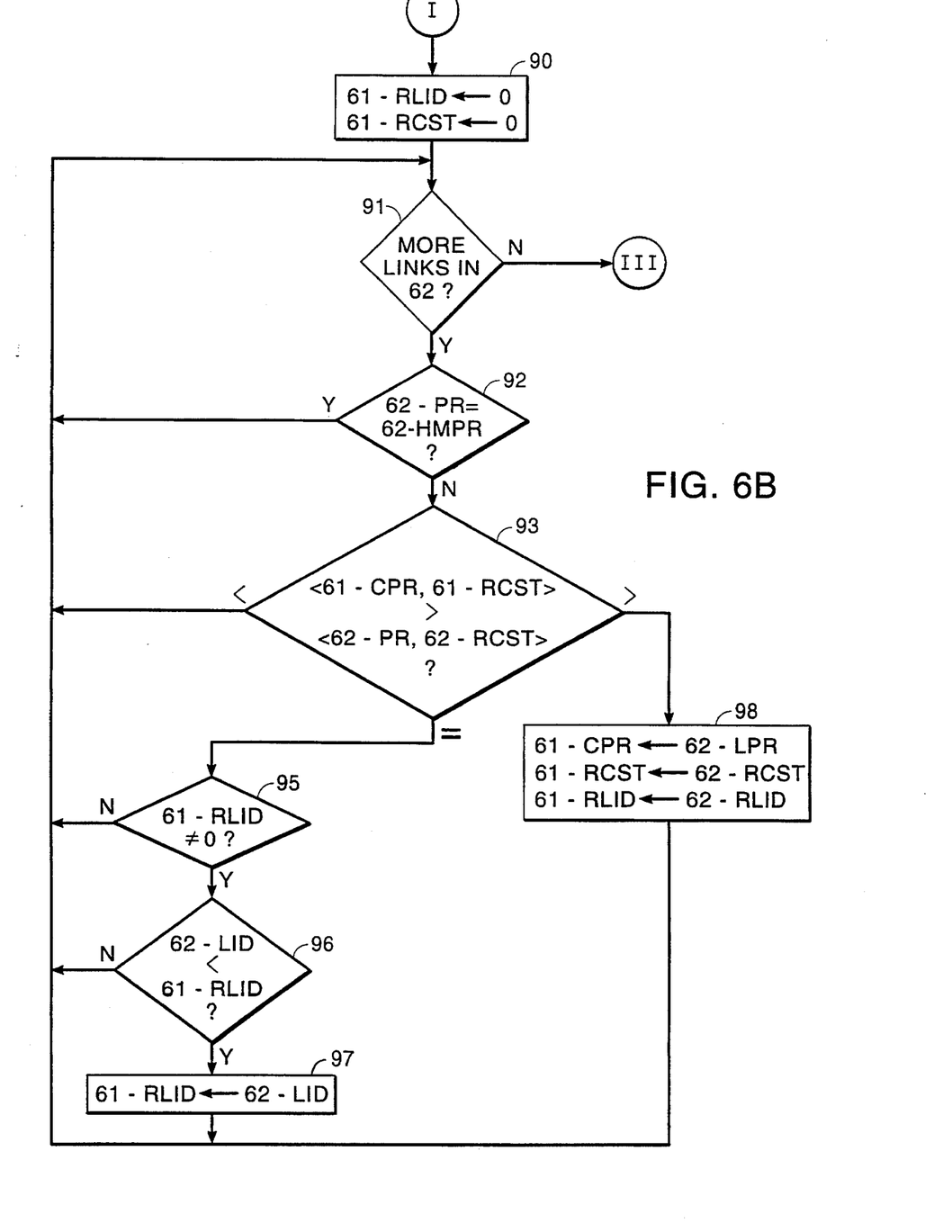

FIG. 6A is an informal flow diagram for stage I. The first block, block 80, is a decision block which causes the links listed in the link table 62 to be processed in sequence. For each link, the appropriate sequence from the blocks 81 to 86 is performed; control then returns to block 80, and the next link is processed. When all the links have been processed, stage I is complete, and the N exit from block 80 is taken, to stage II (FIG. 6B).

After a link has been selected in block 80, the first operations performed are those of block 81, initializing the link values for that link. Thus the link designation 62-DES is set to 1 (true), the link priority 62-LPR is set to the priority for the Hello messages 62-HMPR, and the link root cost 62-RCST is set to the root cost 61-RCST in register set 61.

The distribution unit number 62-DU for the link is then examined in block 82. If this is 1, indicating that the link has a distribution unit neighbour, then block 83 is performed. In this block, the link priority 62-PR is set to <0, 61-HUPR, 61-HUID>. The root cost for the link, 62-RCST, is set to the cost for the link, 62-CST. Finally, the designation for the link 62-DES is set to 0.

If the distribution unit number 62-DU is found to be 0 in block 80, then block 84 follows. This decision block causes the hybrid units listed in the neighbour table 63 for the current link to be processed in sequence; when all have been processed, the operation returns to block 80 for the next link.

Block 84 is followed by block 85, which tests whether the priority field <62-PR, 62-RCST, 61-HUID> is greater than the priority field <63-PR, (63-CST+62-CST), 63-ID>. If it is not, then no action is taken, and the system returns to block 84 and advances to the next hybrid unit for the link. If it is, then in block 86, the link priority 62-PR is replaced by the hybrid unit priority 63-PR, the link root cost 62-RCST is set to the sum of the link cost 62-CST of this link and the root cost 63-CST reported in HU-Hellos from this neighbour, and the link designation 62-DES is set to 0; the system then returns to block 84 and advances to the next distribution unit for the link.

Thus the links are processed in sequence, and for each link with hybrid units as neighbours, the processing is for those hybrid units in sequence. As a result of stage I, the control logic 64 sets the value of priority 62-PR, root cost 62-RCST, and Designation 62-DES for each link in the link table. When this process is complete, stage I is finished.

Stage II

After the priorities, root costs, and designations of all the links have been determined in stage I, stage II follows, which again processes the links in sequence. In this stage, the control logic 64 determines the highest priority link—i.e. the link with the highest priority 62-PR and root cost 62-RCST, If more than one link has the same highest priority, the link with the highest link ID (section 62-LID of the link entry in table 62) is chosen. The link ID of the highest priority circuit is set in the root link ID register 61-RLID. If the hybrid unit itself has a higher priority than the priority of any of its links, then the root link ID register is set to 0. This means that there is no root link, and the hybrid unit is the spanning tree root in an isolated subnetwork. The highest priority is set in the calculated priority register 61-CPR. The root cost for the highest priority link (or zero if the HU is the spanning tree root and has no DU neighbour) is set in the register root cost 61-RCST.

Figure 6C:
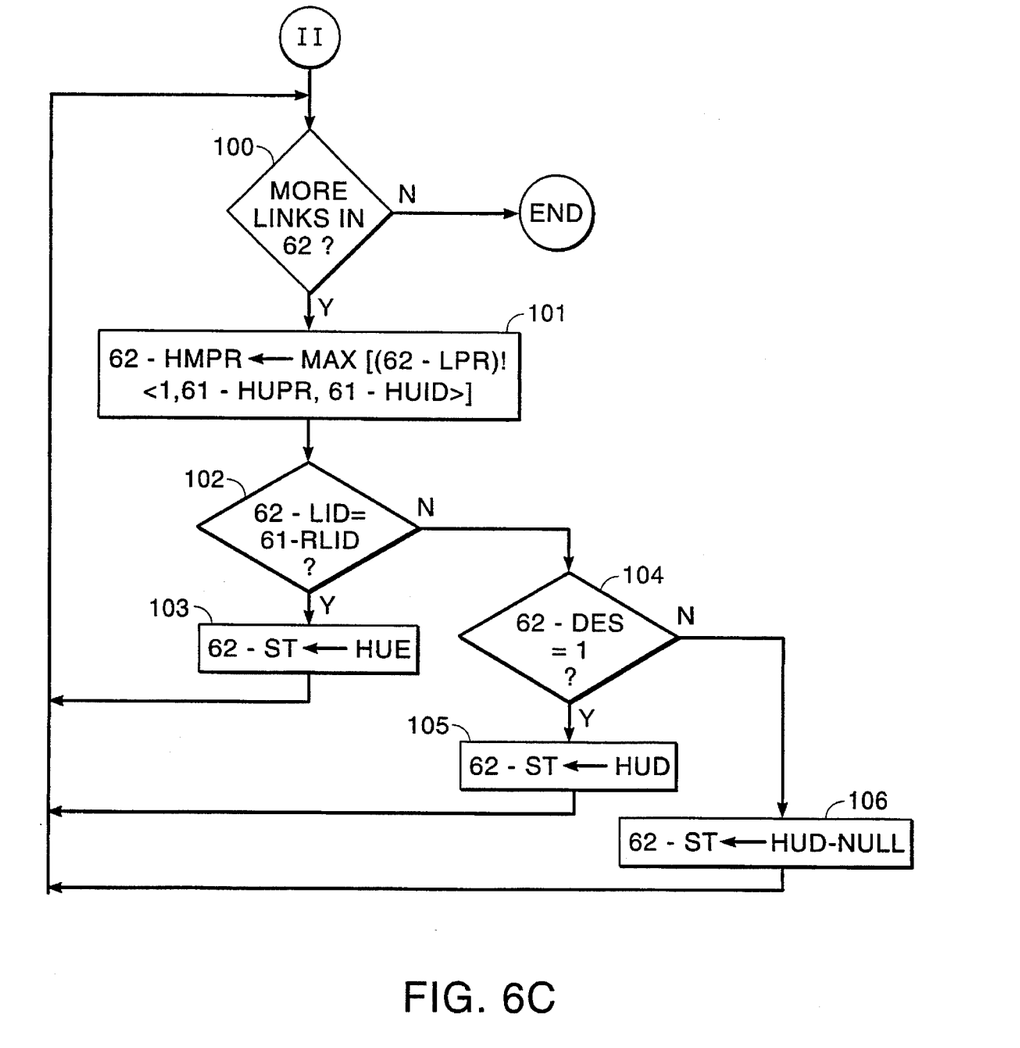

Stage II (FIG. 6B) starts with an initializing block 90 which initializes both the hybrid unit root link ID in register 61-RLID and the hybrid unit root cost in register 61-RCST to 0. This is followed by block 90, a decision block which causes the links listed in the link table 62 to be processed in sequence. For each link, the appropriate sequence from the blocks 92 to 98 is performed; control then returns to block 90, and the next link is processed. When all the links have been processed, stage II is complete, and the N exit from block 90 is taken, to stage III (FIG. 6C).

Block 92 tests whether the link priority 62-PR is equal to the Hello-message priority 62-HMPR for HU-Hello messages sent on that link. If it is, nothing further is done, and the system returns to block 91 to step on to the next link. If it is not, the next block is 93.

Block 93 compares the priority field <61-CPR, 61-RCST> of the hybrid unit with the priority field <62-PR, 62-RCST> of the link. If the result is that the hybrid unit's priority field is less than the link's priority field then no action is taken, and the system returns to block 91 to step to the next link. If the two fields are equal, then checks are made to see whether the hybrid unit's link identifier 61-RLID is 0 (block 95) and whether the link's identifier 62-LID is less than the hybrid unit's root link identifier 61-RLID (block 96). If the hybrid unit's link identifier is 0 or is greater than the link's identifier, then then no action is taken, and the system returns to block 91 to step to the next link. If the hybrid unit's link identifier is greater than 0 and less than the link's identifier, then it it set to equal the link's identifier (block 97), and the system then returns to block 91 to step to the next link. Finally, if the hybrid unit's priority field is greater than the link's priority field, then the hybrid unit's cost priority 61-CPR, root cost 61-RCST, and root link ID 61-RLID are set to match the link's priority 62-LPR, root cos 62-RCST, and link ID 62-LID, with the system then returning to the block 91 to step on to the next link.

Thus the links are processed in sequence, as for stage I. When this process is complete, stage II is finished.

Stage III

Stage III (FIG. 6C) follows, which again processes the links in sequence. In this stage, each link is set to the HUD or HUE state and its Hello-message priority is set. Block 100 is a decision block which causes the links listed in the link table 62 to be processed in sequence. For each link, the Hello-message priority 62-HMPR is set (block 101) to the highest of the priorities of all other links (excluding the link being processed itself) and the priority of the hybrid unit. Block 102 tests whether the link ID 62-LID of the link is the same as that in the root link ID register 61-RLID; if it is, then the link is set to HUE (block 103). If it is not, block 104 tests whether the Designation 62-DES of the link is 1 (true). If it is, the state 62-ST is set to HUD (block 105); if it is not, the state is set to a special null state HUN (block 106) in which the hybrid unit sends only HU-Hello messages on that link, but no DU-Hello or EU-Hello messages.

When all links have been processed in stage III, the spanning tree algorithm is finished.

What is claimed is:

1. A communication network comprising:

end units (EUs) and distribution units (DUs) coupled together by communication links, each end unit having one or more network service access points (NSAP) and each distribution unit including routing tables for routing data packets through the network between end units, the end units and distribution units maintaining knowledge of their neighboring end units and distribution units by exchanging EU-Hello and DU-Hello messages which indicate whether the sender is either an end unit or a distribution unit, and the EU-Hello and DU-Hello messages containing the NSAP(s) of the end units and distribution units, the DUs collectively maintaining complete information about all NSAPs; and a hybrid unit (HU) having one HUE link and a plurality of HUD links, said HUE link coupled with one of said distribution units, each one of said HUD links coupled with one of said end units, said hybrid unit sending on the HUE link EU-Hello messages containing the NSAPs of all EUs from which it receives EU-Hello messages on its HUD links, and sending on the HUD links DU-Hello messages.

2. The communications network as in claim 1, wherein said communication links by which said end units and distribution units are coupled include local area networks (LANs).

3. The communications network as in claim 1 or claim 2, wherein said hybrid unit maintains forwarding information of neighboring end units and distribution units.

4. The communications network as in claim 1 wherein said hybrid unit further comprises an NSAP table which contains a list of all NSAPs contained in EU-Hello messages received by said hybrid unit, and a distribution unit table which contains a list of distribution units to which said hybrid unit is linked.

5. The communications network as in claim 4, said hybrid unit further comprising:

a routing look-up engine, responsive to said hybrid unit receiving a packet on a first link, said first link equal to a first one of said plurality of HUD links, for forwarding said packet onto a second link, said second link equal to a second one of said plurality of HUD links, said forwarding based on forwarding information in said distribution unit table and said NSAP table, and for generating a redirect message containing a destination NSAP and forwarding information matching said destination NSAP when said packet is forwarded onto the same link on which it was received because said first link is the same as said second link.

6. The communications network as in claim 5, said hybrid unit further comprising:

an end unit table;

an EU-Hello message receiver, coupled with said end unit table, for receiving EU-Hello messages, and for storing said received EU-Hello messages in said end unit table; and an EU-Hello generator, coupled with said end unit table, for generating EU-Hello messages based on the contents of said end unit table.

7. The communications network as in claim 1, wherein said hybrid unit is reconfigurable to change the assignments of its links, such that said HUE link may be reconfigured to become an HUD link, and such that any of said HUD links may be reconfigured to become an HUE link.

8. A hybrid unit according to claim 7 wherein the hybrid unit is manually reconfigurable.

9. A hybrid unit according to claim 7 wherein the hybrid unit is automatically reconfigurable.

10. A hybrid unit according to claim 9 wherein the hybrid unit, in cooperation with other hybrid units in the communication network, implements a spanning tree algorithm which selects a single hybrid unit from a connected subnetwork of said other hybrid units as a root unit presenting HUD links to all neighboring hybrid units, said selected root unit neighboring a distribution unit if said connected subnetwork of said other hybrid units is not isolated.

11. A communication network comprising:

End Units and Distribution Units coupled together by communication links, each End Unit having one or more Network Service Access Points, and each Distribution Unit including routing tables for routing data packets through the network between End Units, the End Units and Distribution Units maintaining knowledge of their neighboring End Units and Distribution Units by exchanging End Unit Hello and Distribution Unit Hello messages which indicate whether the sender is either an End Unit or a Distribution Unit, and the End Unit Hello and Distribution Unit Hello messages containing the Network Service Access Points of the End Units and Distribution Units, the Distribution Units collectively maintaining information about all Network Service Access Points; and a Hybrid Unit having one link behaving as an End Unit Link and coupled with one of said Distribution Units, and a plurality of links behaving as Distribution Unit Links, each one of said plurality of links behaving as Distribution Unit links coupled with one of said End Units, said Hybrid Unit sending End Unit Hello messages on said link behaving as an End Unit Link, said End Unit Hello messages containing the Network Service Access Points of all End Units from which said Hybrid Unit receives End Unit Hello messages on said plurality of links behaving as Distribution Unit Links, and said Hybrid Unit sending Distribution Unit Hello messages on said plurality of links behaving as Distribution Unit links.

12. The communications network as in claim 11, wherein said coupling of said Hybrid Unit link behaving as an End Unit Link with said one of said Distribution Units is via one of said communication links.

13. The communications network as in claim 11, wherein said coupling of said plurality of Hybrid Unit links behaving as Distribution Unit Links with said End Units is via a corresponding plurality of said communication links.

14. A communication network comprising:

a plurality of communication links;

one or more End Units, each of said one or more End Units coupled with one of said plurality of communications links, each one of said one or more End Units having one or more Network Service Access Points, each one of said one or more End Units transmitting End Unit Hello Messages containing said one or more Network Service Access Points, and receiving End Unit Hello Messages and Distribution Unit Hello Messages, each one of said End Units maintaining knowledge of those of said one or more End Units and those of one or more Distribution Units that are neighbors to said one of said End Units;

each one of said one or more Distribution Units coupled with one of said plurality of communication links, each one of said one or more Distribution Units having routing tables for routing packets through said communications network between said one or more End Units, each one of said one or more Distribution Units transmitting Distribution Unit Hello Messages and receiving End Unit Hello Messages and Distribution Unit Hello Messages, each one of said one or more Distribution Units maintaining knowledge of those of said one or more End Units and said one or more Distribution Units that are neighbors of said one of said one or more Distribution Units, and said one or more Distribution Units collectively maintaining information about all Network Service Access Points; and a Hybrid Unit having one End Unit link and a plurality of Distribution Unit links, said End Unit link coupled with one of said one or more Distribution Units, each one of said Distribution Unit links coupled with one of said one or more End Units, said hybrid unit sending EU-Hello messages onto said End Unit link, said EU-Hello messages containing the NSAPs of all End Units from which said Hybrid Unit receives EU-Hello messages on said plurality of Distribution Unit links, and said Hybrid Unit sending DU-Hello messages onto said plurality of Distribution Unit links.

15. The communication network as in claim 14, wherein said End Unit link in said Hybrid Unit is coupled with said one of said one or more Distribution Units via one of said plurality of communication links.

16. The communication network as in claim 15, wherein said each one of said plurality of Distribution Unit links in said Hybrid Unit are coupled with said one of said one or more End Units via a corresponding one of said plurality of communication links.

17. The communication network of claim 16, said Hybrid Unit further sending HU-Hello control messages on said End Unit link and said plurality of Distribution Unit links, said HU-Hello control messages allowing neighboring Hybrid Units to recognize said Hybrid Unit as a Hybrid Unit.

18. The communication network of claim 17, said HU-Hello control messages containing information which allows said Hybrid Unit and said neighboring Hybrid Units to use a spanning tree algorithm.

19. The communication network of claim 18, said one or more End Units and said one or more Distribution Units ignoring said HU-Hello control messages.

20. The communications network of claim 19, each one of said HU-Hello control messages including a cost field, said cost field containing the accumulated cost of the path from said Hybrid Unit to a Root Hybrid Unit, said Root Hybrid Unit determined by running of said spanning tree algorithm.

21. The communication network as in claim 20 wherein said Hybrid Unit further comprises an NSAP table which contains a list of all NSAPs contained in EU-Hello messages received by said Hybrid Unit.

22. The communication network as in claim 21 wherein said Hybrid Unit further comprises a distribution unit table which contains DU-Hello messages received on said HUE link.

23. The communications network as in claim 22, said Hybrid unit further comprising:

a routing look-up engine, responsive to said hybrid unit receiving a packet on a first link, said first link equal to a first one of said plurality of HUD links, for forwarding said packet onto a second link, said second link equal to a second one of said plurality of HUD links, said forwarding based on forwarding information in said distribution unit table and said NSAP table, and for generating a redirect message containing a destination NSAP and forwarding information matching said destination NSAP when said packet is forwarded onto the same link on which it was received because said first link is the same as said second link.

* * * * *